(12) United States Patent
Durand et al.

(10) Patent No.: US 8,106,814 B2
(45) Date of Patent: Jan. 31, 2012

(54) METHOD OF ESTIMATING THE ELEVATION OF A BALLISTIC PROJECTILE

(75) Inventors: Bernard Durand, Boullay-lès-Troux (FR); Christian Cavallari, Montigny le Bretonneux (FR); Odile Adrian, Clamart (FR)

(73) Assignee: Thales, Neuilly sur Seine (FR)

( * ) Notice: Subject to any disclaimer, the term of this patent is extended or adjusted under 35 U.S.C. 154(b) by 171 days.

(21) Appl. No.: 12/517,171

(22) PCT Filed: Nov. 30, 2007

(86) PCT No.: PCT/EP2007/063094
§ 371 (c)(1),
(2), (4) Date: Feb. 24, 2010

(87) PCT Pub. No.: WO2008/065194
PCT Pub. Date: Jun. 5, 2008

(65) Prior Publication Data
US 2010/0171649 A1    Jul. 8, 2010

(30) Foreign Application Priority Data

Dec. 1, 2006 (FR) ...................................... 06 10530

(51) Int. Cl.
*G01S 13/68* (2006.01)
(52) U.S. Cl. .......... 342/113; 342/97; 342/106; 342/115; 342/140
(58) Field of Classification Search .............. 342/95–97, 342/106–107, 113, 115, 139–140
See application file for complete search history.

(56) References Cited

U.S. PATENT DOCUMENTS

| | | | |
|---|---|---|---|
| 3,928,851 A * | 12/1975 | Jensen | 342/111 |
| 5,140,329 A | 8/1992 | Maughan et al. | |
| 5,631,654 A | 5/1997 | Karr | |
| 6,467,721 B1 * | 10/2002 | Kautzsch et al. | 244/3.11 |
| 6,956,523 B2 * | 10/2005 | Mohan | 342/133 |
| 7,545,311 B2 * | 6/2009 | Tu et al. | 342/95 |
| 2006/0044183 A1 | 3/2006 | Wells | |
| 2006/0092075 A1 | 5/2006 | Bruce et al. | |
| 2009/0085793 A1 * | 4/2009 | Tu et al. | 342/106 |
| 2010/0171649 A1 * | 7/2010 | Durand et al. | 342/113 |

OTHER PUBLICATIONS

Brousseau, C., et al. "A V.H.F. Multifrequency and Multipolarization Radar: Preliminary Results," Proceedings of the 1996 IEEE National Radar Conferecne. Ann Arbor, May 13-16, 1996, Proceedings of the 1996 National Radar Conference, New York, May 13, 2996, pp. 226-231.

Xiushe, Z., "Engineering problems of low-angle tracking radars," Radar, 2001 CIE International Conference on, Proceedings Oct. 15-18, 2001, Piscataway, NJ, pp. 52-54.

Farina, A., et al., "Classification and Launch-Impact Point Prediction of Ballistic Target via Multiple Model Maximum Likelihood Estimator (MM-MLE)," Radar, 2006 IEEE Conference on, Apr. 2006, Piscataway, NJ, pp. 802-806.

* cited by examiner

*Primary Examiner* — John Sotomayor
(74) *Attorney, Agent, or Firm* — Stroock & Stroock & Lavan LLP

(57) ABSTRACT

The present invention relates to a method enabling precise determination of the elevation of a projectile following a ballistic trajectory by use of a conventional Doppler surveillance radar. The method includes calculating first the estimate $\hat{\Gamma}_\rho$ of the value of the radial component $\Gamma_\rho$ of the acceleration of the projectile from the quantities $\dot{d}$ and $\ddot{d}$, respectively representing the first derivative and the second derivative with respect to time of the Doppler velocity d of the projectile, then calculating the estimate $\hat{V}$ of the speed V of the projectile from d, $\dot{d}$ and $\hat{\Gamma}_\rho$, and finally calculating the estimate $\hat{E}$ of its angle of elevation E from d and $\hat{V}$. The method according to the invention may apply to the protection of sensitive areas against the firing of ballistic projectiles.

3 Claims, 4 Drawing Sheets

METHOD OF ESTIMATING THE ELEVATION OF A BALLISTIC PROJECTILE

CROSS-REFERENCE TO RELATED PRIOR APPLICATION

This is a U.S. National Phase Application under 35 U.S.C. §371 of International Application no. PCT/EP2007/063094, filed Nov. 30, 2007, and claims benefit of French Patent Application No. 06/10530, filed Dec. 1, 2006, both of which are incorporated herein. The International Application was published in French on Jun. 5, 2008 as WO 2008/065197 under PCT Article 21 (2).

FIELD OF THE INVENTION

The present invention relates to the general field of protecting areas against the firing of ballistic projectiles. It relates in particular to the determination of the trajectory of a mortar shell heading towards a protected area. More particularly still, it relates to the implementation of a method enabling precise determination of the elevation of such a projectile that is detected and tracked by a conventional Doppler surveillance radar.

BACKGROUND OF THE INVENTION

Prior Art

When it is wished to protect a given area against the firing of artillery ammunition and in particular against the firing of mortar shells, it is known practice to install a surveillance radar. A conventional type of surveillance consists notably in employing one or more short-range surveillance radars, with a range of around ten km for example. It is generally preferable to use radars operating in the UHF band, a frequency band which, compared to higher frequency bands, L band or S band for example, has the advantage of increasing the radar cross section or RCS of objects illuminated by the emitted radar wave and therefore the probability of detecting these objects.

In addition, in order to effectively protect the area considered, and in particular individuals and assets that are in the area, it is important that, as soon as a projectile entering the area is detected, it is possible to know the trajectory and, in particular, the origin and the point of impact. In general, the trajectory of the projectile is reconstructed using position measurements carried out successively over time by the radar (radial distance and angular position in terms of azimuth and elevation angle). In order to effectively reconstruct this trajectory, it is obviously necessary to have available measurements of sufficient precision. The points of departure and of impact of the projectile are then determined to a precision described by uncertainty ellipses, the size of which is a direct function of the precision of measurements carried out.

In the case of a low-altitude surveillance radar, a category to which the radars used to carry out such surveillance generally belong, a particular problem arises, a problem linked with the reflections of the radar wave from the ground or from obstacles located on the ground, in particular buildings. These spurious reflections create interference with the radar wave, interference which is known to have the effect of impairing the precision of measurements carried out, in particular the precision of elevation (or elevation angle) measurements carried out by the radar. The impairments are all the greater when the measured position is situated at a lower altitude. In particular they make the measurements carried out on the projectile close to the time it leaves the mortar, or more generally the launcher, imprecise or even unusable.

These impairments are, in addition, all the greater when the frequency band used by the radar is lower. That is why, in an environment encouraging multiple reflections, due to the fact, for example, that the ground has little relief and constitutes a surface that strongly reflects the radar waves or alternatively due to the presence of large obstacles, one is often led to use radars operating in higher frequency bands, for example microwave bands such as L band, that are less sensitive to the phenomenon. In so doing, the benefit of a larger RCS is lost and the probability of detection for a comparable emission power is reduced.

PRESENTATION OF THE INVENTION

One aim of the invention is to solve this measurement precision problem and to propose a solution making it possible to use a conventional Doppler surveillance radar operating in the UHF band to carry out measurements of the position of a ballistic projectile moving at low altitude with a precision making it possible to reconstruct the trajectory of this projectile from the measurements carried out.

To this end, the subject of the invention is a method for determining the angle of elevation of a projectile following a ballistic trajectory, characterized in that it includes the following steps:

a first step of estimating, at the time considered, the values of the quantities $\dot{d}$ and $\ddot{d}$ respectively representing the derivative and the second derivative with respect to time of the Doppler velocity d of the target;

a second step of estimating the radial component of the acceleration $\Gamma_\rho$ of the projectile, this radial component being defined by the following approximation relation:

$$\ddot{d} \approx -2 \cdot \frac{d\Gamma_\rho}{dt}$$

a third step of estimating the value of the velocity V of the projectile at the time considered, the estimated velocity being defined by the following relation:

$$\hat{V} = (\dot{d}^2 - \ddot{d} \cdot R - \hat{\Gamma}_\rho \cdot R)^{1/2}$$

a fourth step of estimating the value of the estimation E of the elevation of the projectile at the time considered, this elevation being estimated by integration as a function of time from the following relation:

$$\frac{d\hat{E}}{dt} = \frac{1}{R} \cdot (\hat{V}^2 - \dot{d}^2)^{1/2}$$

According to a variant implementation, the method according to the invention furthermore includes, between the third and fourth steps, an intermediate step of estimating the value of the attitude angle presented by the projectile at the time considered, the attitude angle being defined by the following relation:

$$\dot{d} = V \cdot \cos \psi$$

the estimation of the attitude angle $\psi$ presented by the projectile making it possible to plot the value of the radar cross section presented by the projectile.

According to another variant implementation, the method according to the invention furthermore includes a complementary step of calculating the precision $\sigma_V^2$ of the estimation of the velocity of the projectile and the precision $\sigma_E^2$ of the estimation of the angle of elevation, $\sigma_V^2$ and $\sigma_E^2$ being respectively defined by the following relations:

$$\sigma_V^2 \approx \frac{1}{4 \cdot \hat{V}^2} \cdot \left[ 4 \cdot d^2 \cdot \sigma_d^2 + K \cdot \frac{R^2 \cdot \sigma_d^2}{\Delta t^2} + \sigma_R^2 \cdot \left( d^2 + \hat{f}_\rho^2 \right) \right],$$

$$\sigma_E^2 = \frac{\Delta t^2}{2 \cdot R^2 \cdot (\hat{V}^2 - d^2)} \cdot \left[ \left( \frac{\hat{V}^2 - d^2}{R} \right)^2 \cdot \sigma_R^2 + \hat{V}^2 \cdot \sigma_V^2 + d^2 \cdot \sigma_d^2 \right]$$

in which the following quantities respectively represent:
d, the Doppler velocity of the projectile,
$\sigma_d$, the precision of d,
R, the radial distance measured,
$\sigma_R$, the precision of R,
$\Delta t$, measurement refresh time.

DESCRIPTION OF THE FIGURES

The features and advantages of the invention will be better appreciated through the following description, which description draws on the appended figures, which figures present.

DETAILED DESCRIPTION

Figure 1:
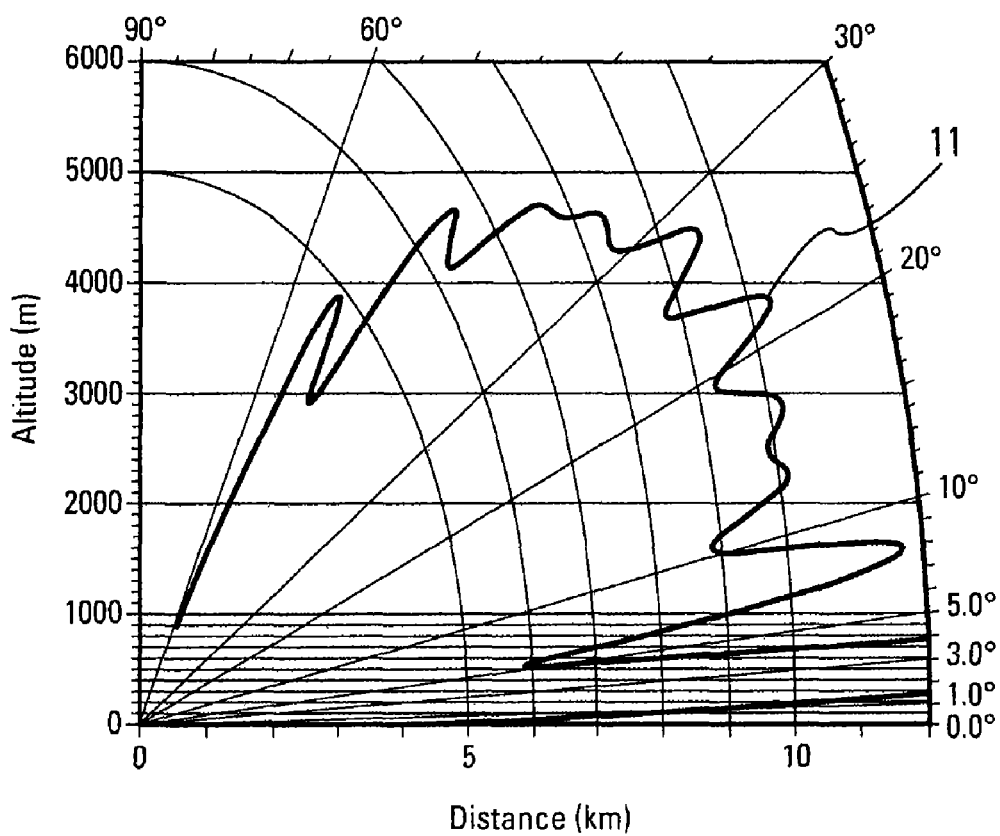
FIG. 1, the coverage diagram of a UHF surveillance radar.

FIG. 1 is considered first, which presents an example of a coverage diagram for a UHF (Ultra High Frequency) radar of the type often used for carrying out surveillance of the airspace surrounding an area to be protected and for detecting and tracking the trajectory of mortar shells. This diagram, marked by the curve 11, shows how the range of the radar considered varies as a function of the elevation angle. As can be observed in the figure, and as previously said, the elevation (elevation angle) coverage diagram shows large variations in the range of the radar as a function of the elevation, notably in relation to low elevation angles, typically between 0 and 20°.

Thus in the example of the figure, it is observed that the radar has a maximum range for very low elevation angles, with a maximum for elevation angles, elevations, extending from 1.5° to 4° or alternatively for elevations with a value situated around 8°, and a shorter range for the elevation angles between 4° and 8° and for elevation angles between 10° and 20°.

This range dispersion as a function of the elevation, which affects radars operating at UHF and which is due notably to the strong influence of multiple reflections of the signal and in particular of reflections from the ground, results in detection losses or even in late detection of projectiles having a particular angle of elevation corresponding to an area of short radar range. Thus, for a radar having a coverage diagram such as that of FIG. 1, a projectile approaching the radar with an angle of elevation of around 4° will be detected only from a relatively short distance, of around 7 km, while the same projectile approaching with an angle of elevation of 8° will for its part be detected earlier at a distance greater than 10 km. In addition, insofar as a projectile generally follows a trajectory that causes it to approach its objective with a variable angle, it is possible for an initially detected projectile to no longer be the object of detection for a given time lapse and consequently for the threat that it represents to be ignored.

Figure 2:
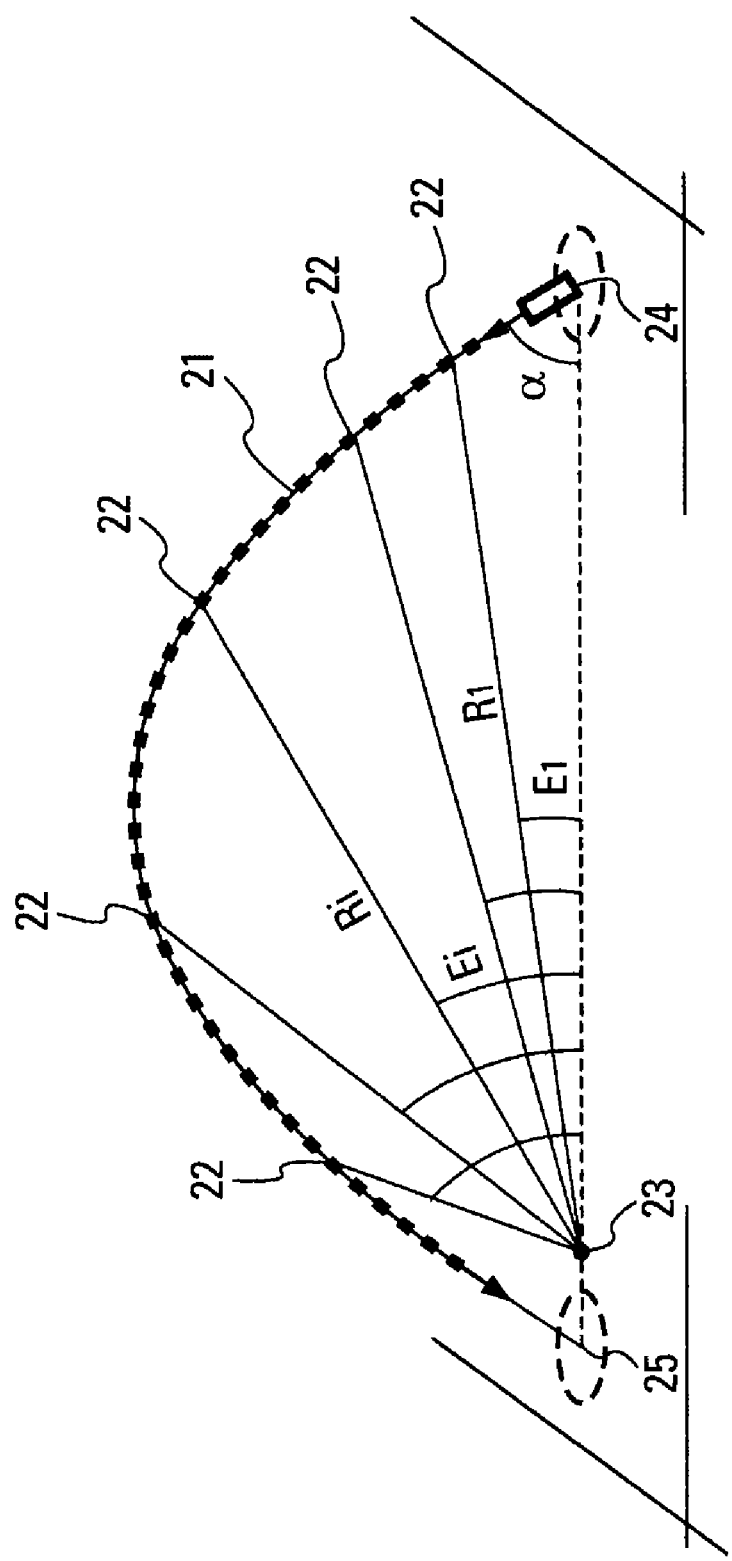
FIG. 2, a schematic illustration of the ballistic trajectory followed by the projectiles to which the invention applies.

FIG. 2 represents a typical ballistic trajectory 21 such as, for example, a mortar shell may follow. This shell is fired in the direction of the target to be reached, situated for example in the area under surveillance by the radar, with a large firing angle α, typically around 50° to 75°. It then follows a ballistic trajectory determined mainly by its own physical characteristics, its initial acceleration, and by the firing angle.

As the type of trajectory followed by the projectile is known, it is possible to reconstruct the trajectory of the projectile and even to determine with a given precision its point of departure 24 and the probable point of impact 25, provided that it is possible to know its position 22 at various times.

In practice, the trajectory of a projectile entering an area protected by a surveillance radar can generally be reconstructed from information about the position of the projectile relative to the radar, which information is periodically updated by the radar. In general, the information used is the radial distance $R_i$ separating the projectile from the radar at a measurement time i, the azimuth $A_i$ (not shown in the figure) and the angle of elevation $E_i$ at which the projectile is detected. Consequently, as the radar is situated at a known point 23, it is possible to determine whether the trajectory of the projectile presents any danger for the projected area. Conventionally, the azimuth and the angle of elevation are measured by known methods of angular error measurement which for each type of angle, azimuth and elevation, involve the formation of a channel called the "sum channel" and of a channel called the "difference channel". However, in order to obtain precise measurements and hence a precise determination of the position of the projectile at the instant in question, it is important for the signals received to have little interference. Yet experiment and practice show that this condition is sometimes poorly met, in particular when a radar operating in the UHF frequency band is employed to carry out surveillance. This is because operation in the UHF band makes the radar more sensitive, in particular, to interference due to multiple reflections of the signal, interference which more specifically impairs the measurement of the angle of elevation, so that a conventional angular error measurement proves to be unsatisfactory as a means of knowing precisely the angle of elevation of the projectile and hence its position. For this reason, in order to determine the angle of elevation, the method according to one or more embodiments of the invention employs an alternative method to the conventional error measurement calculation.

Figure 3:
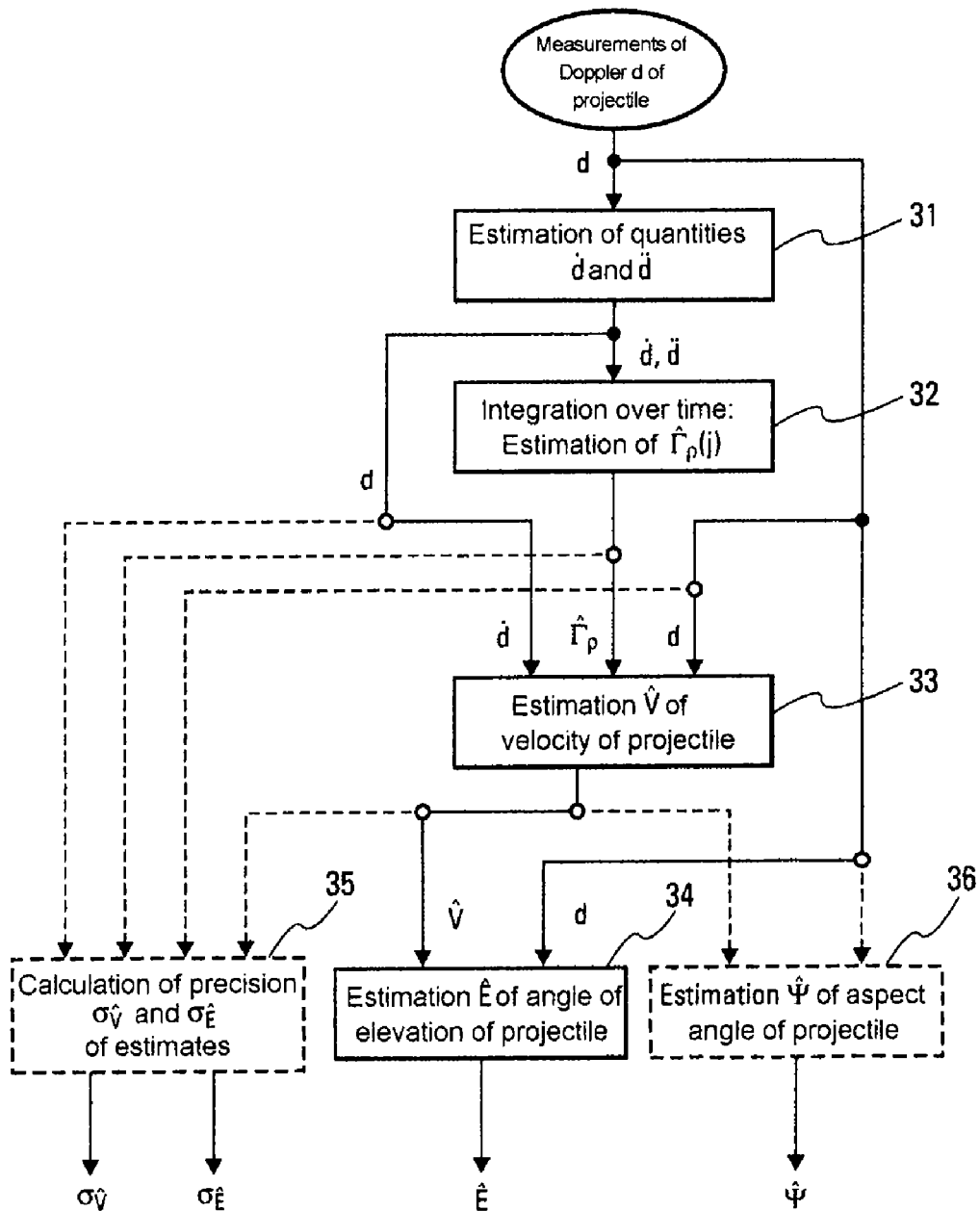
FIG. 3, a flow chart of the method according to the invention in principle.

FIG. 3 provides an overview of the various steps implemented by the method according to one or more embodiments of the invention in order to determine the angle of elevation of the projectile at a given time.

As FIG. 3 illustrates, the method according to one or more embodiments of the invention is applied to the information about the velocity d obtained from signal samples s(j) corresponding to periodic measurements of the signal s(t) carried out by the radar in the direction considered. Thus, if T represents the measurement refresh time, it is possible to write $S_j = S(j) = S(t_0 + jT)$ where $t_0$ represents an arbitrary time origin. The velocity information d is here obtained conventionally, for example by spectral analysis of the signal by FFT over N points and interpolation of Doppler filters that have provided a significant response. As previously described, the method according to one or more embodiments of the invention includes several steps which make it possible, starting with these input data, to obtain a precise estimate of the angle of elevation. These various steps are described in the remainder of the description.

The first step 31 includes estimating, from the values of d obtained, the values of functions $\dot{d}$ and $\ddot{d}$ defined by:

$$\dot{d} = \frac{d(d)}{dt}, \ddot{d} = \frac{d^2(d)}{dt^2}$$

According to one or more embodiments of the invention, $\dot{d}$ and $\ddot{d}$ may be estimated by any known method from successive measurements of d, in particular by means of predictive estimators based on Taylor expansions, or alternatively by means of estimators with a structure based on a linear combination of Legendre polynomials. These methods, not set out here, thus make it possible, for example, to express the vector of values $(d_j, \dot{d}_j, \ddot{d}_j)$ by the following relation:

$$\begin{bmatrix} d_j \\ \dot{d}_j \\ \ddot{d}_j \end{bmatrix} = M \cdot \begin{bmatrix} d_j \\ d_{j-1} \\ d_{j-2} \\ d_{j-3} \end{bmatrix}, \quad [1]$$

with:

$$M = \begin{bmatrix} 1 & 0 & 0 & 0 \\ 11/6 & 3 & -3/2 & 1/3 \\ 1 & -5/2 & 2 & -1/2 \end{bmatrix} \quad [2]$$

The second step then includes estimating the value $\Gamma_\rho(j)$ of the radial component of the acceleration of the projectile.

Figure 4:
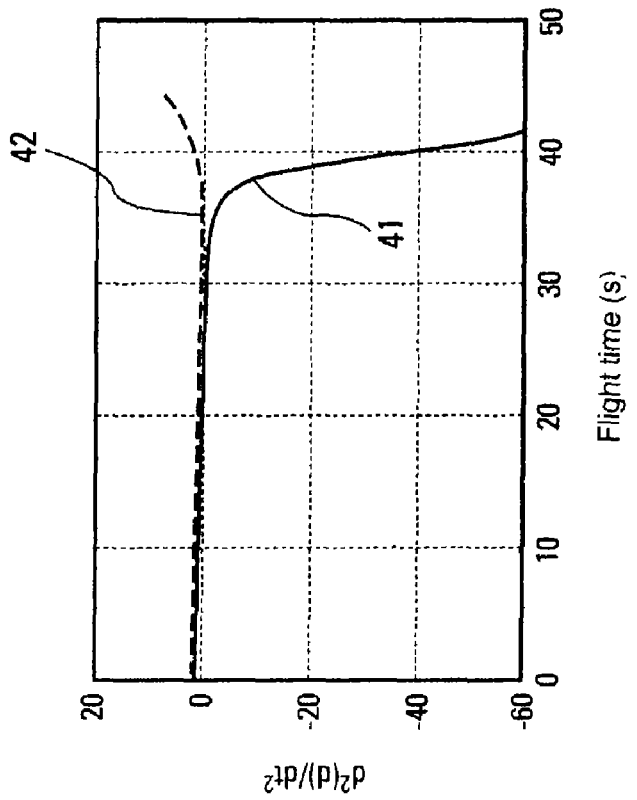

Studies by the applicant have shown, as FIG. 4 illustrates, that over limited time intervals the acceleration $\Gamma_\rho(j)$ of the projectile is related to the quantity $\ddot{d}$ by the following relation:

$$\ddot{d} \approx -2 \cdot \frac{d\Gamma_\rho}{dt} \quad [3]$$

Consequently, $\Gamma_\rho$ can advantageously be estimated from the following relation:

$$\Gamma_\rho(t) \approx -\frac{1}{2} \cdot \int \ddot{d} dt + \Gamma_{\rho 0} \quad [4]$$

This advantageous result is made use of in the course of step 32 in order to make an estimate of the value $\Gamma_\rho(j)$ of acceleration for a sample j, this estimation then being defined by the following recurrence relation:

$$\hat{\Gamma}_\rho(j) = \hat{\Gamma}_\rho(j-1) - \frac{\ddot{d}(j) \cdot \Delta t}{2} \text{ for } j \geq 2 \quad [5]$$

and $$\hat{\Gamma}\rho(1) = \Gamma_{\rho 0}$$

in which $\Delta t$ represents the sampling period and $\Gamma_{\rho 0}$ the initial value of the radial component of the acceleration of the projectile.

In the case of a mortar shell, this radial component is dependent notably on the firing angle (i.e. angle of the sight), on the initial speed, on the mass, and on the ballistic coefficient of the projectile.

The similarity of the curves 41 and 42, which respectively represent a model of the derivative of the radial component of the acceleration of the projectile against time and the corresponding curve obtained from successive estimations of this function obtained by means of the method according to one or more embodiments of the invention, illustrates that this approximation is well founded in the case of a mortar shell.

The third step 33 then includes estimating the actual speed of the projectile, or more precisely the magnitude of the velocity vector. According to one or more embodiments of the invention, the estimate $\hat{V}(j)$ of the speed of the projectile at a given measurement time is made from corresponding values of $d(j)$, $\dot{d}(j)$ and $\hat{\Gamma}_\rho(j)$. The speed of the projectile is then estimated using the following relation:

$$\hat{V}(j)=(\dot{d}^2(j)-\ddot{d}(j)\cdot R(j)-\hat{\Gamma}_\rho(j)\cdot R(j))^{1/2} \quad [6]$$

The fourth step 34 includes estimating the value of the angle of elevation at a given measurement time t ($t=t_0+jT$) as a function of the estimate $\hat{V}(j)$ of speed made in the preceding step. The angle of elevation of the projectile is then estimated from the following relation:

$$\frac{d\hat{E}}{dt} = \frac{1}{R} \cdot (\hat{V}^2 - \dot{d}^2)^{1/2} \quad [7]$$

Such that, according to one or more embodiments of the invention, the angle of elevation of the projectile is estimated using the following relation:

$$\hat{E}(j) = \hat{E}(j-1) + \frac{1}{R(j)} (\hat{V}^2(j) - \dot{d}^2(j))^{1/2} \cdot \Delta t \text{ for } j \geq 2 \quad [8]$$

and $$\hat{E}(1) = E_0$$

in which $\Delta t$ represents the sampling period and $E_0$ the initial value of the elevation of the projectile, fixed so as to take account of, notably, the firing angle of the projectile and the relief conditions of the area covered. In the case of a mortar shell, $E_0$ can be fixed at a value of the order of a few degrees, 2 degrees for example.

Figure 5:
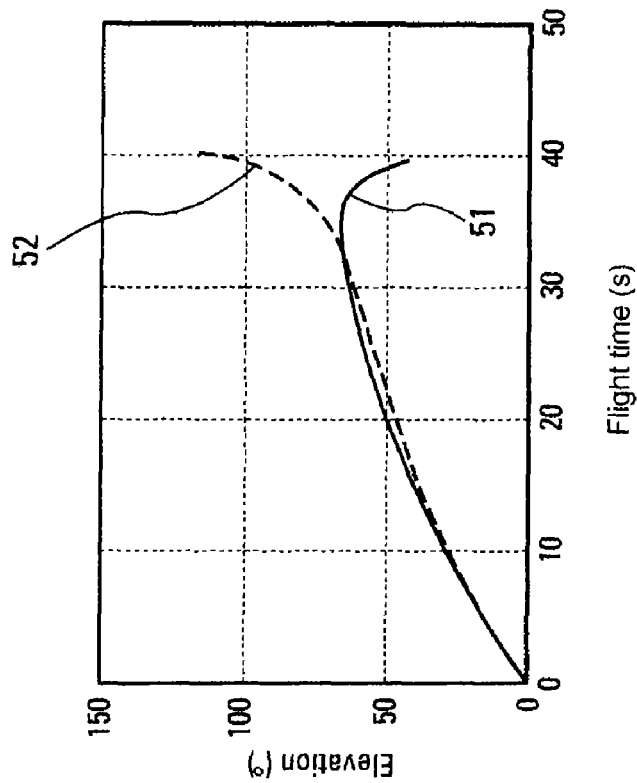
FIGS. 4 and 5, curves demonstrating the conformity of estimates of the angle of elevation made by the method according to one or more embodiments of the invention with the ballistic trajectory model.

At the end of these four steps, an estimate of the angle of elevation E is finally obtained for each measurement carried out by the radar. As the curves 51 and 52 of FIG. 5 illustrate, which respectively represent a model of the variation over time of the angle of elevation of a mortar shell and the corresponding curve obtained from successive positions of the projectile estimated by means of the method according to one or more embodiments of the invention, the estimate made closely coincides over a defined interval, the divergence of the curves appearing only later when the probable trajectory of the projectile is known. Thus, the estimate made using the method according to one or more embodiments of the invention can therefore be seen to be a valid estimate of the angle of elevation, and the method according to one or more embodiments of the invention therefore advantageously offers a valid alternative to a conventional measurement of the angle of elevation by angle error measurement.

As soon as a set of measurements is available, periodically separated in time, of the radial distance R, of the azimuth A and of the angle of elevation E, it is possible to reconstruct the probable trajectory of a projectile that has no means of guidance or propulsion of its own, as is the case with mortar shells. Likewise, it is possible to determine with a given precision the point of departure of the projectile and the position of the point of impact. This precision obviously depends on the precision with which the various parameters are estimated at each measurement. A method such as that described hereinabove, insofar as it makes it possible to improve the estimation of the angle of elevation relative to known methods while employing simple calculations is therefore of great advantage.

According to an advantageous variant implementation, the method according to one or more embodiments of the invention may also include a step 35, parallel to the step 34, which makes it possible to determine the precision of the estimation of the angle of elevation obtained at the end of step 34.

The processing carried out in the course of step 35, shown in dotted lines in FIG. 3, includes calculating the standard deviation of the estimate of the angle of elevation from the values measured or estimated during the preceding steps, successively using the following relations which define the precision of the speed estimate and the precision of estimation of the angle of elevation:

$$\sigma_V^2 \approx \frac{1}{4 \cdot \hat{V}^2} \cdot \left[ 4 \cdot d^2 \cdot \sigma_d^2 + K \cdot \frac{R^2 \cdot \sigma_{\ddot{d}}^2}{\Delta t^2} + \sigma_R^2 (\dot{d}^2 + \hat{\Gamma}_\rho^2) \right] \quad [9]$$

where $\sigma_V$ represents the precision of the estimate of the speed of the projectile, $$\sigma_E^2 \approx \frac{\Delta t^2}{2 \cdot R^2 \cdot (\hat{V}^2 - d^2)} \cdot \left[ \left( \frac{(\hat{V}^2 - d^2)}{R} \right)^2 \cdot \sigma_R^2 + \hat{V}^2 \cdot \sigma_V^2 + d^2 \cdot \sigma_d^2 \right] \quad [10]$$

where $\sigma_E$ represents the precision of the estimate of the angle of elevation of the projectile,
in which relations the following variables respectively represent:
- $\sigma_d$ the precision of the determination of the Doppler velocity d
- $\sigma_R$ the precision of the measurement of the measured radial distance
- K, a coefficient that reflects the sensitivity of the precision that can be achieved when estimating the speed of the projectile at the acceleration given to this projectile. The coefficient K depends in particular on the method used for making the estimates of $\dot{d}$ and $\ddot{d}$.

According to a second variant implementation, which can furthermore be combined with the preceding variant, the method according to one or more embodiments of the invention may also include a complementary step 36 during which the value $\psi(j)$ of the aspect angle $\psi$ associated with the projectile is estimated. Knowing the value of this angle $\psi$ makes it in particular possible advantageously to plot the value of the radar cross section presented by the projectile at the time considered.

Step 36, represented by dotted lines in the illustration of FIG. 3, includes estimating the value of the aspect angle $\psi(j)$ defined by the following relation:

$$d(j) = V(j) \cdot \cos \psi(j) \quad [11]$$

where V represents the modulus of the velocity vector of the projectile at the time considered and d the measured Doppler velocity.

The invention claimed is:

1. A method for determining an angle of elevation of a projectile following a ballistic trajectory, comprising the steps of:
   estimating, at a predetermined time a first derivative and a second derivative with respect to time of a Doppler velocity of the projectile;
   estimating the radial component of an acceleration of the projectile, the radial component being determined in accordance with the following approximate relationship:

$$\ddot{d} \approx -2 \cdot \frac{d\Gamma_\rho}{dt};$$

estimating a speed of the projectile at the predetermined time, the estimated speed being determined in accordance with the following relationship:

$$\hat{V} = (\dot{d}^2 - \ddot{d} \cdot R - \hat{\Gamma}_\rho \cdot R)^{1/2};$$

estimating an angle of elevation of the projectile at the predetermined time, the angle of elevation being estimated in accordance with the following relationship:

$$\frac{d\hat{E}}{dt} = \frac{1}{R} \cdot (\hat{V}^2 - \dot{d}^2)^{1/2},$$

wherein:
   d is the Doppler velocity of the projectile;
   $\dot{d}$ is the first derivative with respect to time of the Doppler velocity;
   $\ddot{d}$ is the second derivative with respect to time of the Doppler velocity;
   R is a radial distance measured;
   $\Gamma_\rho$ is the acceleration of the projectile;
   V is the speed of the projectile;
   E is the angle of elevation of the projectile; and
   ^ indicates an estimation of a respective parameter.

2. The method as claimed in claim 1, further comprising, between the steps of estimating the speed and estimating the elevation, a step of estimating an attitude angle presented by the projectile at the predetermined time, the attitude angle being determined in accordance with the following relationship:

$$\Psi = \cos^{-1}(d/V),$$

wherein:
   $\psi$ is the attitude angle; and
   the attitude angle is used to plot a value of a radar cross section presented by the projectile.

3. The method as claimed in claim 1, further comprising a step of calculating a precision of the estimation of the speed of the projectile and a precision of the estimation of the angle of elevation, $\sigma_V^2$ and $\sigma_E^2$ being respectively determined in accordance with the following relationships:

$$\sigma_V^2 \approx \frac{1}{4 \cdot \hat{V}^2} \cdot \left[ 4 \cdot d^2 \cdot \sigma_d^2 + K \cdot \frac{R^2 \cdot \sigma_{\ddot{d}}^2}{\Delta t^2} + \sigma_R^2 \cdot (\dot{d}^2 + \hat{\Gamma}_\rho^2) \right],$$

$$\sigma_E^2 = \frac{\Delta t^2}{2 \cdot R^2 \cdot (\hat{V}^2 - d^2)} \cdot \left[ \left( \frac{\hat{V}^2 - d^2}{R} \right)^2 \cdot \sigma_R^2 + \hat{V}^2 \cdot \sigma_V^2 + \dot{d}^2 \cdot \sigma_d^2 \right]$$

wherein:
   d is the Doppler velocity of the projectile;
   $\sigma_d$ is a precision of d;
   R is a radial distance measured;
   $\sigma_R$ is a precision of R;
   $\Delta t$ is a measurement refresh time.

* * * * *